US012569859B2

(12) United States Patent
Nieminen

(10) Patent No.: US 12,569,859 B2
(45) Date of Patent: Mar. 10, 2026

(54) CRUSHING EQUIPMENT AND A METHOD FOR CONTROLLING THE SAME

(71) Applicant: Metso Finland Oy, Espoo (FI)

(72) Inventor: Paavo Nieminen, Tampere (FI)

(73) Assignee: Metso Finland Oy, Espoo (FI)

( * ) Notice: Subject to any disclaimer, the term of this patent is extended or adjusted under 35 U.S.C. 154(b) by 199 days.

(21) Appl. No.: 18/547,773

(22) PCT Filed: Mar. 9, 2022

(86) PCT No.: PCT/EP2022/056035

§ 371 (c)(1),
(2) Date: Aug. 24, 2023

(87) PCT Pub. No.: WO2022/189506

PCT Pub. Date: Sep. 15, 2022

(65) Prior Publication Data

US 2024/0131526 A1 Apr. 25, 2024
US 2024/0226913 A9 Jul. 11, 2024

(30) Foreign Application Priority Data

Mar. 9, 2021 (EP) .................................... 21161595

(51) Int. Cl.
*B02C 25/00* (2006.01)
*B02C 2/00* (2006.01)
*B02C 21/02* (2006.01)
*B02C 23/12* (2006.01)

(52) U.S. Cl.
CPC ............ *B02C 25/00* (2013.01); *B02C 21/026* (2013.01); *B02C 23/12* (2013.01)

(58) Field of Classification Search
CPC ................................ B02C 25/00; B02C 23/12
See application file for complete search history.

(56) References Cited

U.S. PATENT DOCUMENTS 4,295,420 A * 10/1981 Satake ...................... B02C 4/32 99/620
2011/0089270 A1* 4/2011 Juha ........................ B02C 25/00 241/34
2015/0122920 A1* 5/2015 Dallimore ............. B02C 13/095 241/24.1

FOREIGN PATENT DOCUMENTS

CN 207271316 U * 4/2018
EP 2676732 A1 12/2013
(Continued)

OTHER PUBLICATIONS

English translate (CN207271316U), retrieved date Jul. 23, 2025.*
(Continued)

*Primary Examiner* — Mohammed S. Alawadi
(74) *Attorney, Agent, or Firm* — Andrus Intellectual Property Law, LLP

(57) ABSTRACT

A method for controlling crushing equipment, wherein the crushing equipment includes a crusher, a feeding arrangement for feeding material to the crusher, a secondary equipment arranged downstream from the crusher for sorting out oversized material leaving the crusher, and a recirculation loop for recirculating the oversized material fed to the crusher. The method includes the steps of stop feeding new material to the crushing equipment through said feeding equipment, recirculating the oversized material from the secondary equipment to the crusher and decreasing a crusher setting of the crusher.

13 Claims, 4 Drawing Sheets

(56) References Cited

FOREIGN PATENT DOCUMENTS

| | | | |
|---|---|---|---|
| WO | 2009156585 | A1 | 12/2009 |
| WO | 2018158662 | A1 | 9/2018 |

OTHER PUBLICATIONS

International Search Report and Written Opinion for International Application No. PCT/EP2022/056035, mailed Jun. 30, 2022.

International Preliminary Report on Patentability for International Application No. PCT/EP2022/056035, mailed Feb. 9, 2023.

* cited by examiner

CRUSHING EQUIPMENT AND A METHOD FOR CONTROLLING THE SAME

CROSS-REFERENCE TO RELATED APPLICATIONS

This application is the U.S. national stage application of International Application PCT/EP2022/056035, filed Mar. 9, 2022, which international application was published on Sep. 15, 2022, as International Publication WO 2022/189506 A1 in the English language. The International Application claims priority European Patent Application No. 21161595.0 filed Mar. 9, 2021.

FIELD OF THE INVENTION

The present invention relates to a crushing equipment for crushing materials. The present invention also relates to a method for controlling a crushing equipment.

BACKGROUND ART

Crushers are known in the art. They are utilized to reduce the size of rocks and stones in e.g. aggregates, recycling and mining applications into desired dimension. This may be performed by having a desired gap width between the inner crushing shell and the outer crusher shell, a crusher setting of the crusher. Usually the crusher setting is greater than a largest allowed exiting material size. To reduce the material size, material is shaped against material in order to gain better shape and less wear on wear parts. However, by having the crusher setting greater than the largest allowed exiting material size, a problem that occurs is that there is material in the crusher that is not able to leave the crushing process due to its material size. Thus, the amount of feed material and the amount of exiting material in the crusher may not correlate with each other, there may be more material entering the crusher than leaving the crusher. A further problem that occurs is that due to the material not leaving the crusher, an infinitive recirculation loop in the crushing process may occur.

In an attempt to meet this problem, prior art solutions suggest maintaining an even level in the feeding hopper by adjusting the speed of the drive shaft and/or the gap width. Other prior art solutions suggest adjusting the gap width of the crusher when a reduction in feed material in the crushing chamber is detected. A problem with the prior solutions is to reduce the material level in an easy and efficient way. There is thus a need in the art for a simplified and efficient process to overcoming these problems.

SUMMARY

It is an object to mitigate, alleviate or eliminate one or more of the above-identified deficiencies in the art and disadvantages singly or in any combination and solve at least the above-mentioned problem.

According to a first aspect, these and other problems are solved in full, or at least in part, by a method for controlling a crushing equipment, wherein the crushing equipment comprises a crusher, a feeding arrangement for feeding material to the crusher, a secondary equipment arranged downstream from the crusher for sorting out oversized material leaving the crusher, and a recirculation loop for recirculating said oversized material to the crusher, the method comprising the following steps:

- stop feeding new material to the crushing equipment through said feeding equipment;
- recirculating the oversized material from the secondary equipment to the crusher; and
- decreasing a crusher setting of the crusher.

The decreasing of the crusher setting may be performed step by step, such as a stepwise decreasing is performed.

The decreasing of the crusher setting of the crusher may be remotely controlled, and thus, the crusher setting may be automatically decreased, e.g. by a control system. Having the crusher setting being automatically decreased may be advantageous as it allows for emptying the crushing equipment in an easier and more efficient way. In addition, by stop feeding new material to the crushing equipment and at the same time decreasing the crusher setting, a particle size of recirculated material is decreased, and thus, the material level in the crusher is reduced. This provides for that all material in the crushing equipment is allowed to leave the crushing equipment, when the particle size has reached a desired particle size, without any actions from an operator.

According to some embodiments, the step of recirculating the oversized material is executed until a parameter of the material in the crushing equipment has reached a pre-defined value.

According to some embodiments, the crusher setting is decreased until no material is returned into the recirculation loop.

The crusher setting may be stepwise decreased until no material is returned into the recirculation loop.

According to some embodiments, the material parameter is determined by using detection means.

The detection means may be configured to detect material level, material weight, material flow, material load of the conveyors and/or crusher load of the crusher.

According to some embodiments, the step of decreasing the crusher setting is executed until the crusher setting has reached a first pre-defined crusher setting.

According to some embodiments, the first pre-defined crusher setting is set to be a minimum crusher setting.

According to some embodiments, wherein the step of decreasing the crusher setting comprises:

- monitoring a crusher load in the crushing equipment; and
- if the crusher load is smaller than a pre-defined crusher load value, decreasing the crusher setting by a pre-defined step.

According to some embodiments, the crusher load is defined from crusher power consumption and/or load indication measures.

According to some embodiments, the method further comprising, if the crusher setting has reached the first pre-defined crusher setting and the material parameter is above the pre-defined material value:

- recalibrating the crushing equipment such that when the crusher setting has reached the first pre-defined crusher setting, the material parameter should have reached the pre-defined value.

According to some embodiments, the method further comprising, wherein the crusher setting has reached the first pre-defined crusher setting and the material parameter has reached the pre-defined value:

- increasing the crusher setting to be a second pre-defined crusher setting.

Optionally, when the crusher setting has reached said second pre-defined crusher setting, new material can be fed to the crushing equipment.

According to a second aspect, these and other problems are solved in full, or at least in part, by a crushing equipment for crushing material. The crushing equipment comprising:

- a crusher;
- a feeding arrangement for feeding material to the crusher;
- a secondary equipment arranged downstream from the crusher for sorting out oversized material leaving the crusher;
- a recirculation loop for recirculating said oversized material to the crusher; and
- a control system for decreasing a crusher setting of the crusher.

Alternatively, the control system may be configured to increasing the crusher setting of the crusher. Alternatively, the control system may be configured to adjusting the crusher setting of the crusher. Alternatively, the control system may be configured to control the crushing equipment.

According to some embodiments, the recirculation loop comprises detection means for determining one or more parameters of material present in the recirculation loop.

According to some embodiments, the crushing equipment further comprising monitoring means for monitoring a crusher power and/or load in the crushing equipment. This can refer to electrical or hydraulic load. Also, in some embodiments such power and/or load of conveyors and/or the recirculation loop is monitored.

Effects and features of the second aspect is largely analogous to those described above in connection with the first aspect. Embodiments mentioned in relation to the first aspect are largely compatible with the second aspect.

It is further noted that the inventive concepts relate to all possible combinations of features unless explicitly stated otherwise.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only and is not intended to be limiting. It must be noted that, as used in the specification and the appended claim, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals may be used for similar elements, and wherein.

DETAILED DESCRIPTION

The present disclosure will now be described more fully hereinafter with reference to the accompanying drawings, in which currently preferred embodiments of the disclosure are shown. This disclosure may, however, be embodied in many different forms and should not be constructed as limited to the embodiments set forth herein; rather, these embodiments are provided for thoroughness and completeness, and to fully convey the scope of the disclosure to the skilled person.

Figure 1:
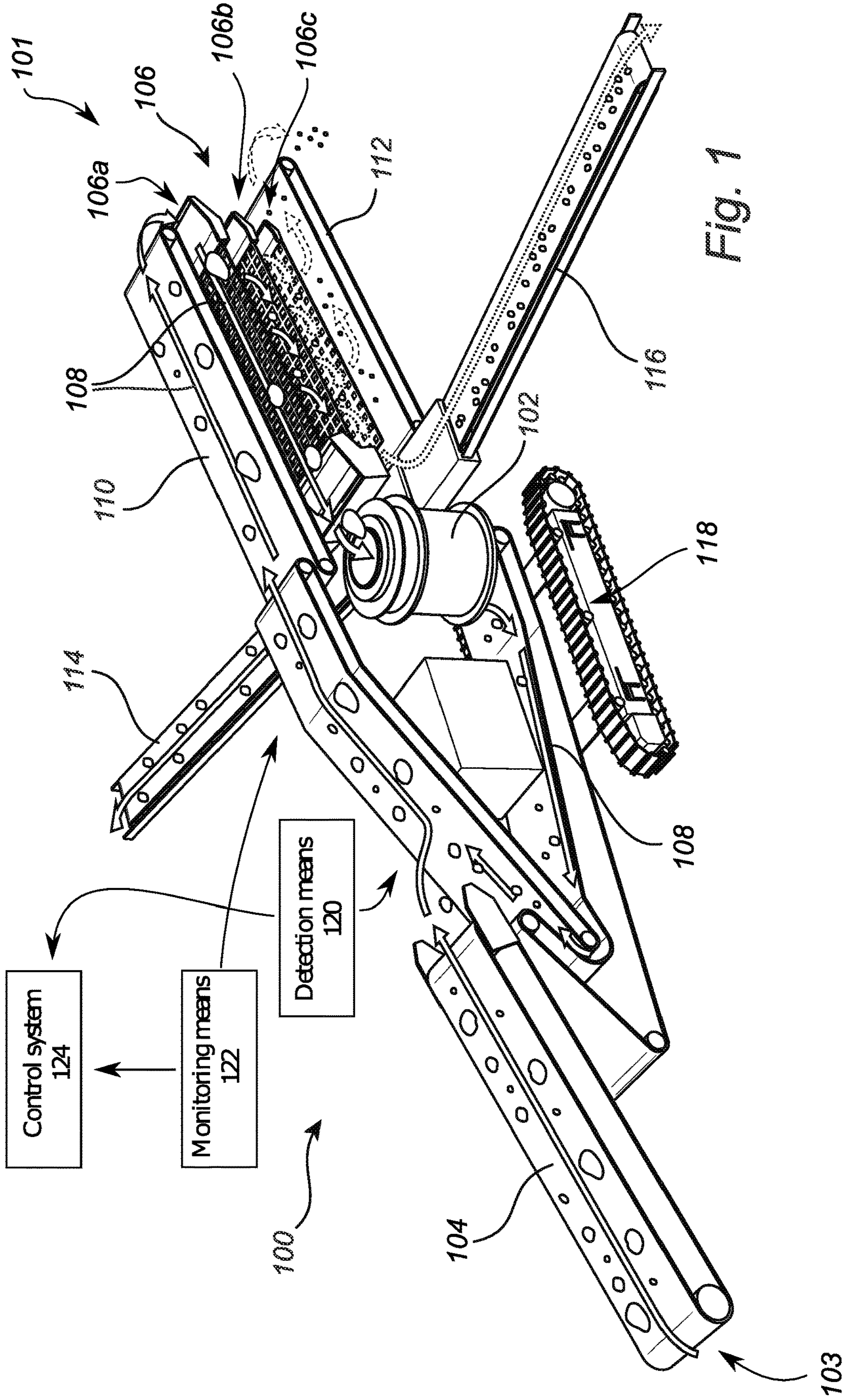
FIG. 1 is a perspective view of a crushing equipment.

FIG. 1 illustrates a crushing equipment 100 for handling material, such as stone, rock, ore, or the like. FIG. 1 further illustrates a crushing process of the crushing equipment 100. The crushing equipment 100 extends along a longitudinal direction from a rear end 101 to a front end 103 of the crushing equipment 100. As illustrated in FIG. 1, the crushing equipment 100 is a movable crushing equipment comprising means of a continuous track arrangement 118 in order to be able to move between different production sites. However, the crushing equipment 100 according to the present disclosure can be any crushing equipment, movable or stationary, known in the art.

The crushing equipment 100 comprises a crusher 102 and a feeding arrangement 104. The feeding arrangement 104 is for feeding material from an external equipment to the crusher 102. The crusher 102 is for reducing the size of the material handled by the crushing equipment 100. The size of the material is reduced by that different parts of material, such as different rocks or stones, being shaped against each other and at the same time against wear parts of the crusher 102. The crusher 102 comprises a crusher setting, wherein the crusher setting defines a gap width 202 between an inner crushing shell 204 and an outer crushing shell 206 of a crushing chamber 208 of the crusher 102. The gap width 202 defines how much material that can be processed through the crusher 102 at the same time. The crusher 102 is most clearly illustrated in FIG. 3 and will be discussed in more detail accordingly.

The crushing equipment 100 further comprises a secondary equipment 106 for sorting out oversized material leaving the crusher 102. The oversized material is recirculated via a recirculation loop 108 to the crusher 102 in order to be further crushed into desired size. Thus, there is no oversized material able to leave the crushing equipment 100. The secondary equipment 106 may comprise one screen deck. The secondary equipment 106 may comprise two or more screen decks. As illustrated in FIG. 1, the secondary equipment 106 comprises three screen decks **106*a*, 106*b*, 106*c*. The first screen deck 106*a* is for sorting non-oversized material from the oversized material, wherein the non-oversized material is discharged from the crushing equipment 100. By having two or more screen decks, it is, in addition to sort non-oversized material from the oversized material, possible to sort the non-oversized material in different collections based on the dimension of the non-oversized material. By recirculating the oversized material via the recirculation loop 108, both new materials, received from the external equipment, and oversized material, received from the recirculation loop 108, is fed to the crusher 102. The oversized material is recirculated in the recirculation loop 108 until the material size is small enough to pass the secondary equipment 106**.

In addition, the crushing equipment 100 comprises a plurality of conveyors 110, 112, 114, 116 for transporting the material through the crushing equipment 100 and for discharging the non-oversized material from the crushing equipment 100.

It should be understood that many alternative embodiments of the crushing equipment 100 comprising many alternative configurations of processing, by a crusher and/or a secondary equipment, and internal transport means exist within the scope of the claims.

The crushing equipment 100 further comprises detection means 120 for determining one or more parameters of the material present in the crushing equipment 100. Preferably, the detection means 120 determines one or more parameters of the oversized material present in the recirculation loop 108. Alternatively, or in combination, the detection means 120 may be configured to determine the electrical and/or hydraulic load or setting of the crusher 102, electrical and/or hydraulic power or load of conveyors 110, 112, 114, 116, electrical and/or hydraulic power or load of the recirculation loop 108. As non-limiting examples, the detection means 120 can comprise one or more of ultrasonic sensors, belt scale, machine vision and/or laser scanners for detecting the one or more parameters of the material. However, the detection means 120 can comprise any device configured to determine the one or more parameters of the material. As non-limiting examples, parameters that may be determined are e.g. material flow, material level and/or material weight. The detection means 120 can be located anywhere in the crushing equipment 100 depending on the type of detection means 120 and what parameter that may be determined. The detection means 120 can be located in vicinity to the crushing equipment 100 depending on the type of detection means 120 and what type of parameter that may be determined.

The crushing equipment 100 further comprises monitoring means 122 for monitoring a crusher load in the crushing equipment 100. Preferably, the monitoring means 122 monitors the crusher load in the crusher 102. Preferably, the monitoring means 122 monitors the crusher load of the conveyors 110, 112, 114, 116. As non-limiting example, the monitoring means 122 may e.g. be pressure sensors. The monitoring means 122 can be located anywhere in the crushing equipment 100 depending on the type of monitoring means 122 and what type of crusher load that may be monitored. The monitoring means 122 can be located in vicinity to the crushing equipment 100 depending on the type of monitoring means 122 and what type of crusher load that may be determined.

According to one non-limiting example, the detection means 120 and the monitoring means 122 may be incorporated within one and the same device, such as one device may be configured to determine the parameters of the material and/or the crusher setting and/or the crusher load of the crushing equipment 100.

The detection means 120 can be connected to a control system 124 for controlling the crushing equipment 100. The control system 124 may be adapted to receive the parameters from the detection means 120. The control system 124 may be adapted to analyze the parameters from the detection means 120. The control system 124 may be configured to detect a difference between the parameter of the material and pre-defined values for the material and/or for the crusher 102.

The monitoring means 122 can be connected to the control system 124 for controlling the crushing equipment 100. The control system 124 may be adapted to receive the crusher load from the monitoring means 122. The control system 124 may be adapted to analyze the crusher load from the monitoring means 122. The control system 124 may be configured to monitor a difference between the crusher load and a pre-defined crusher load value for the crusher 102 or the crushing equipment 100.

By connecting the detection means 120 and/or the monitoring means 122 to the control system 124, it is possible to overview the crushing process and the material in the crushing equipment 100. By connecting the detection means 120 and/or the monitoring means 122 to the control system 124, it is possible to remotely control the crushing equipment 100. This will be discussed in more detail in connection with FIG. 2.

Although discussed separately, any combination of the detection means 120 and the monitoring means 122 may be used to determine the material parameters and/or the crusher setting and/or monitor the crusher load.

Figure 2:
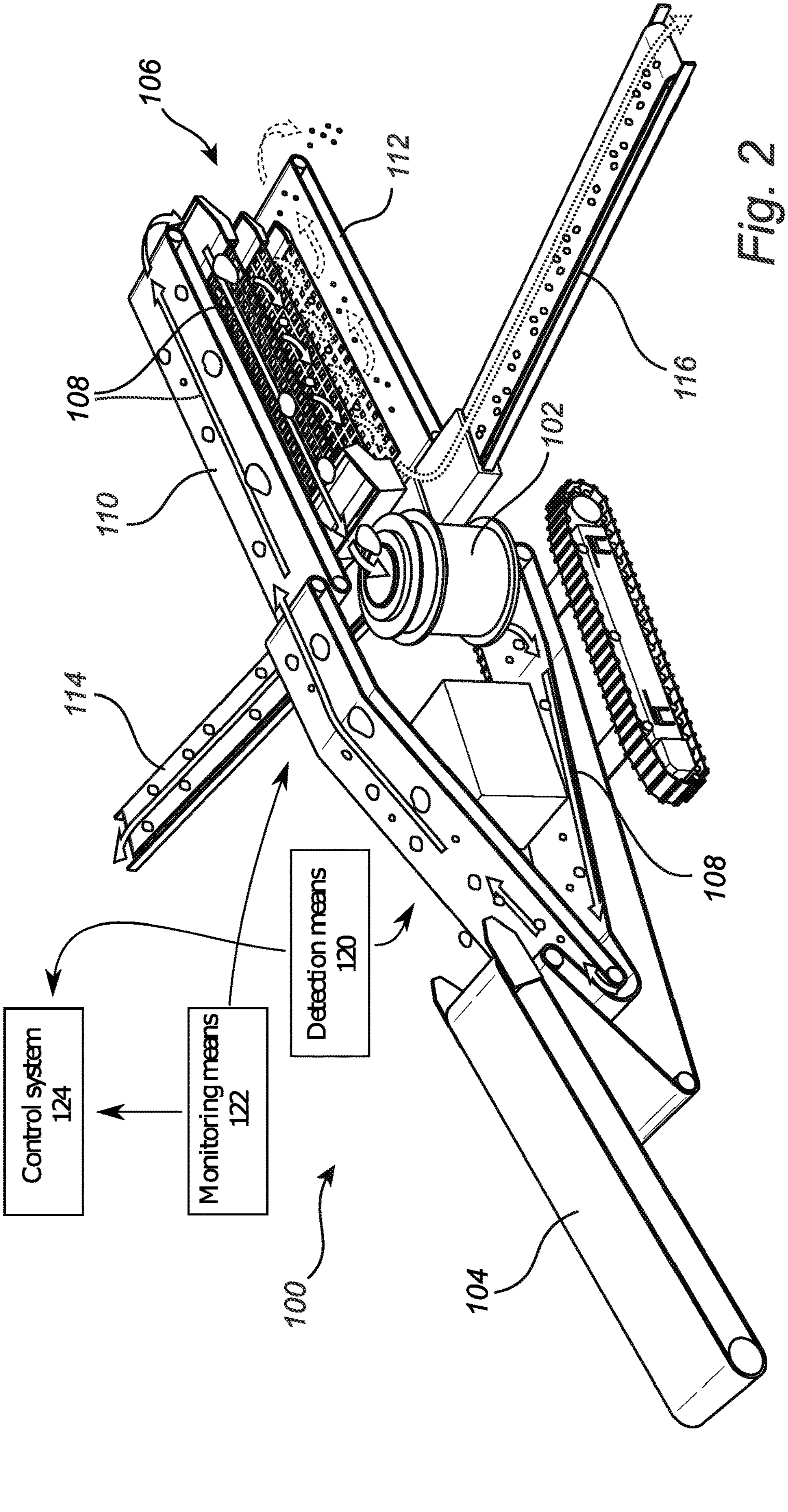
FIG. 2 illustrates closed loop crushing process of the crushing equipment of FIG. 1.

With reference to FIG. 2, a closed loop crushing process of the crushing equipment 100 is illustrated. The closed loop crushing process is defined by that no new material is fed to the crushing equipment 100. When the crushing process illustrated in FIG. 1 is stopped, the closed loop crushing process may be activated. It should be understood that the crushing equipment 100 can be completely turned off as well, meaning that both the crushing process and the closed loop crushing process are stopped.

Since no new material is fed to the crushing equipment 100 via the feeding arrangement 104, only the oversized material in the recirculation loop 108 is the material present in the crushing equipment 100. By stop feeding new material to the crushing equipment 100, the material level in the crushing equipment 100 can be reduced. The closed loop crushing process may be used when the crushing equipment 100 should be partly or fully emptied, thus when the material level in the crushing equipment 100 should be reduced or set to zero. This may be desirable for a lot of different reasons, such as when the crushing equipment 100 should be emptied before maintenance operation but also, if the crushing equipment 100 is a movable crushing equipment as illustrated in FIGS. 1 and 2, when the crushing equipment 100 needs to be moved, e.g. to another site or on public roads.

Stopping the crushing process and thus, starting the closed loop crushing process is done either manually, by an operator, or remotely by e.g. the control system 124. Preferably, the closed loop crushing process is remotely controlled. By remotely controlling the crushing equipment 100 and the closed loop crushing process, the emptying of the crushing equipment 100 will be managed in an easy and efficient way without any actions from the operator.

In addition, when the closed loop crushing process is activated, the crusher setting of the crusher 102 is remotely decreased by the control system 124. The crusher setting may be stepwise decreased. By stepwise decreasing the crusher setting, the crusher setting stepwise approaches the oversize screen deck size. Thus, by stop feeding new material to the crushing equipment 100 and at the same time stepwise decreasing the crusher setting, the material level in the crushing equipment 100 will be stepwise reduced. The crusher setting is stepwise decreased in order to avoid load peaks in the crushing equipment 100.

A method for controlling the crushing equipment 100 comprises the steps of stop feeding new material to the crushing equipment 100 through the feeding arrangement 104, recirculating the oversized material from the secondary equipment 106 to the crusher 102, and decreasing the crusher setting of the crusher 102. Preferably, the method is remotely controlled, e.g. by the control system 124.

According to one example, by monitoring the crusher load in the crushing equipment 100 using the monitoring means 122 and transmitting the crusher load to the control system 124, it is possible to determine if the crusher setting should be decreased. As a non-limiting example, the crusher setting may be decreased by a pre-defined step. The control system 124 is configured to compare the monitored crusher load with a pre-defined crusher load value. If the monitored crusher load is smaller than the pre-defined crusher load value, the crusher setting is decreased by the pre-defined step. This procedure may be executed until a minimum allowed crusher setting is reached, or until the crushing equipment 100 is empty. Alternatively, decreasing the crusher setting is executed until a pre-defined time period is reached. The pre-defined time period can be set by the operator. Alternatively, the pre-defined time period can be based on parameters of the material in the crushing equipment 100 and/or on the monitored crusher load.

By determining the crusher load in the crusher 102, it is possible to determine whether or not the crusher 102 is processing the material into smaller sizes or if the material passes the crusher 102 without reducing the material size. If the material passes the crusher 102 without reducing the material size and at the same time is not discharged via the secondary equipment 106, the material size may be too small for the crusher 102 but too large for the secondary equipment 106. If this may be the case, the crusher setting may be decreased. The crusher load is defined from crusher power consumption and/or load indication measures. According to non-limiting examples, a crusher adjusting pressure or a piston pressure in the crusher 102 may be suitable to use as an indicator for determining whether or not it is time for decreasing the crusher setting. Alternatively, a crusher measured power, an electric motor power, a hydraulic motor pressure and/or a diesel engine load with mechanical crusher drive may be suitable to use as the indicator for determining whether or not it is time for decreasing the crusher setting. Thus, when the crusher setting is decreased, the crusher load is increased. According to one example, when there is no crusher load in the crusher 102, there may not be any material left in the crusher 102. Thus, the material has left the crusher 102 and passed the secondary equipment 104.

The control system 124 is configured to control the decreasing of the crusher setting based on the monitored crusher load.

Alternatively, decreasing the crusher setting is executed until the parameter of the material in the crushing equipment has reached a pre-defined value. The parameter of the material is determined by the detection means 120 of the crushing equipment 100. Thus, if the parameter of the material is determined to be zero, there may not be any material left in the crushing equipment 100. Alternatively, if the crusher setting is small enough such that material passes the secondary equipment 106, there may not be any material left in the crushing equipment 100. Alternatively, if the detection means 120 and/or the monitoring means 122 may determine that the crusher chamber 208 is empty, there may not be any material left in the crushing equipment 100.

Alternatively, decreasing the crusher setting of the crusher 102 is executed until the crusher setting has reached a pre-defined crusher setting. The pre-defined crusher setting may be set by the operator. The crusher setting is determined by the detection means 120 and transmitted to the control system 124. The control system 124 is configured to compare the determined crusher setting with the pre-defined crusher setting. If the determined crusher setting is greater than the pre-defined crusher setting, the decreasing of the crusher setting may be continued. The pre-defined crusher setting can be set to a minimum crusher setting. The determined crusher setting can be compared with the material size that is able to pass the secondary equipment 106. If the crusher setting is smaller than the material size able to pass the secondary equipment 106, it will indicate that the crushing equipment 100 soon is empty, if it is not already is. Thus, if the crusher setting is smaller than the material size able to pass the secondary equipment 106, the material processed in the crusher may be of smaller dimensions than the allowed dimension regarding the secondary equipment 106.

Alternatively, the crusher setting may be decreased until no material is left in the crushing equipment 100. The detection means 120 may be configured to determine how much material that is left in the crushing equipment 100. As non-limiting examples, whether there is no material left in the crusher 102 nor in the recirculation loop 108, the crushing equipment 100 is empty.

Although discussed separately, any combination of the above may be used to determine for how when to stop the crushing process.

The closed loop crushing process further comprises recalibrating the crushing equipment 100. Thus, if the crusher setting has reached the first pre-defined crusher setting and the material parameter is above the pre-defined material value, the crushing equipment 100 should be recalibrated. The crushing equipment may be recalibrated such that when the crusher setting has reached the first pre-defined crusher setting, the material parameter should have reached the pre-defined value. This may be remotely controlled, e.g. by the control system 124.

The closed loop crushing process further comprises increasing the crusher setting to a second pre-defined crusher setting. Wherein the crusher setting has reached the second pre-defined crusher setting, the closed loop crushing process is stopped, and the crushing process illustrated in FIG. 1 is activated. Thus, new material is fed to the crushing equipment 104 via the feeding arrangement 104. Preferably, the first pre-defined crusher setting is smaller than the second pre-defined crusher setting.

Preferably, the crusher setting is adjusted based on the determined crusher load as discussed above. Preferably, the other alternatives of decreasing the crusher setting is used for avoiding crushing idling state and in order to recalibrate the crushing equipment. However, it is understood that the different alternatives for decreasing the crusher settings can be used for any purposes in the disclosure.

Thus, it is understood that the purpose of the closed loop crushing process is to reduce the material level in the crushing equipment 100 by recirculating the oversized material in the recirculation loop 108, by using the closed loop crushing process, and at the same time automatically decreasing the crusher setting of the crusher 102 such that the dimensions of the oversized material is decreased. Further, the purpose of the closed loop crushing process is to eliminate all material in the crushing equipment 100 such that there is no material left in the crushing equipment 100. As discussed above, this is preferably remotely controlled, by e.g. the control system 124.

In addition, the control system 124 may also be able to report problems within the crushing equipment 100 based on the information obtained by the detection means 120 and/or the monitoring means 122.

There are numerous advantages and usefulness of remotely controlling the crushing equipment 100 as in the present disclosure. It provides for an easier and more efficient emptying process for the operator, thus the crushing equipment 100 may be emptied without any actions from the operator.

Figure 3:
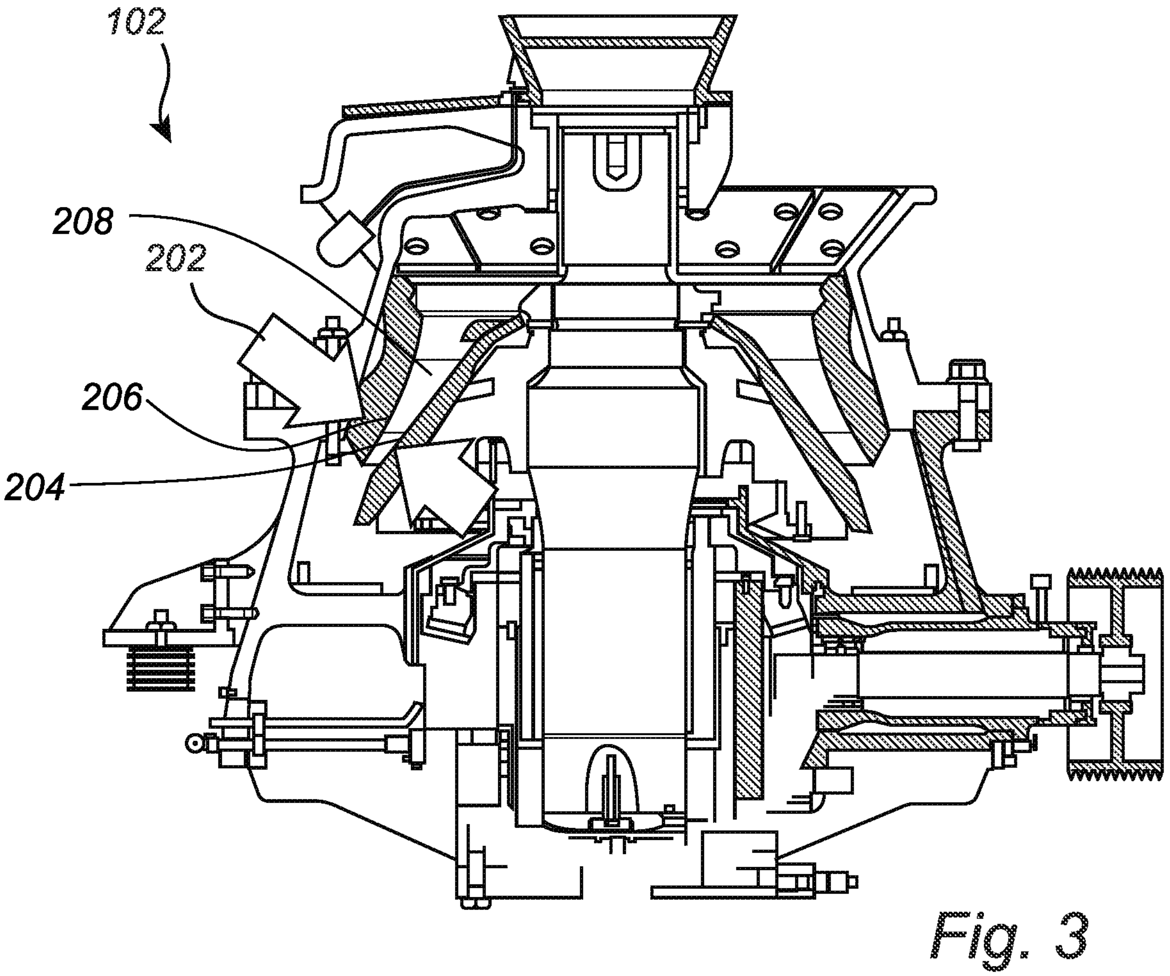
FIG. 3 is a perspective view of a crusher of the crushing equipment of FIG. 1.

In FIG. 3, the crusher 102 of the crusher equipment 100 is illustrated in further detail. The crusher 102 comprises the crushing chamber 208, wherein the material is crushed. The crusher 102 further comprises the inner crushing part 204 and the outer crushing part 206, wherein the inner crushing part 204 and the outer crushing part 206 is configured to define the gap width 202 of the crusher 102.

The crusher 102 can be any crusher wherein the crusher setting is adjustable. The crusher 102 can be any crusher wherein the crusher setting is measurable.

Figure 4:
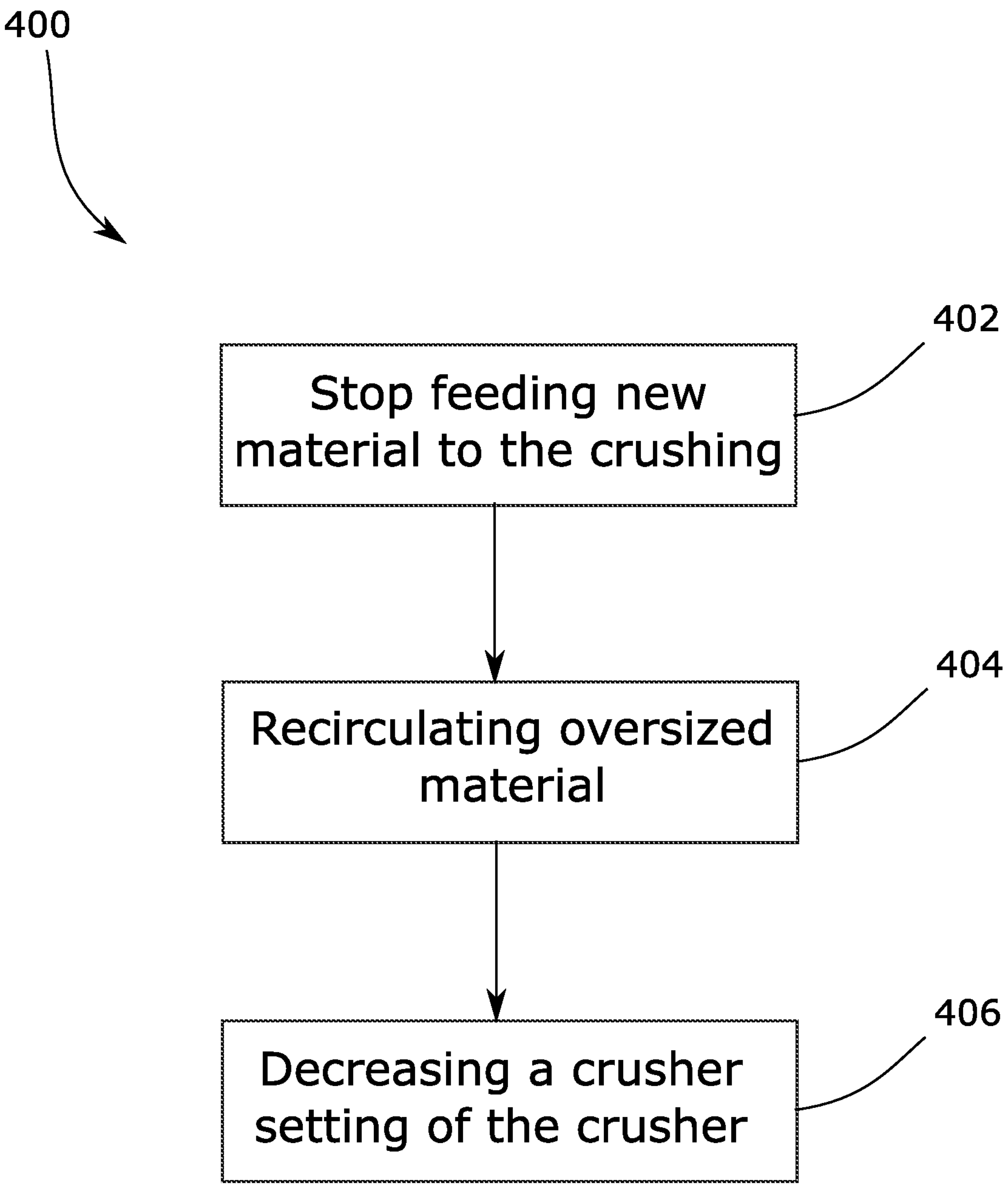
FIG. 4 is a schematic flow chart of a method for controlling a crushing equipment according to the disclosure.

With reference to FIG. 4, a schematic flow chart representation of a method 400 for controlling the crushing equipment 100 will be described. The method 400 comprises the following steps:

Stop S402 feeding new material to the crushing equipment 100 through the feeding arrangement 104, recirculating S404 the oversized material from the secondary equipment to the crusher 102, and decreasing S406 the crusher setting of the crusher 102. The method may either be manually controlled by an operator or remotely controlled by the control system 124.

Optionally, if the crusher setting has reached the first pre-defined crusher setting and the material parameter is above the pre-defined material value, recalibrating the crushing equipment 100 such that when the crusher setting has reached the first pre-defined crusher setting, the material parameter should have reached the pre-defined value.

Optionally, wherein the crusher setting has reached the first pre-defined crusher setting and the material parameter has reached the pre-defined value, the crusher setting may be increasing to the second pre-defined crusher setting. When the crusher setting has reached said second pre-defined crusher setting, there may be start feeding new material to the crushing equipment 100.

The person skilled in the art realizes that the present invention by no means is limited to the preferred embodiments described above. On the contrary, many modifications and variations are possible within the scope of the appended claims. Additionally, variations to the disclosed embodiments can be understood and effected by the skilled person in practicing the claimed invention, from a study of the drawings, the disclosure, and the appended claims.

The invention claimed is:

1. A method for controlling a crushing equipment, wherein the crushing equipment comprises a crusher, a feeding arrangement for feeding material to the crusher, a secondary equipment arranged downstream from the crusher for sorting out oversized material leaving the crusher, and a recirculation loop for recirculating said oversized material to the crusher, the method comprising the following steps:

stop feeding new material to the crushing equipment through said feeding equipment;

recirculating the oversized material from the secondary equipment to the crusher;

decreasing a crusher setting of the crusher; and keeping the crusher setting decreased while the feeding of new material to the crushing equipment, by the feeding arrangement, is stopped, so as to reduce a level of the oversized material in the recirculation loop.

2. The method according to claim 1, wherein the step of recirculating the oversized material is executed until a material parameter of the material in the crushing equipment has reached a pre-defined value.

3. The method according to claim 1, wherein the crusher setting is decreased until no material is returned into the recirculation loop.

4. The method according to claim 2, wherein the material parameter is determined by using detection means.

5. The method according to claim 2, wherein the step of decreasing the crusher setting is executed until the crusher setting has reached a first pre-defined crusher setting.

6. The method according to claim 5, wherein the first pre-defined crusher setting is set to be a minimum crusher setting.

7. The method according to claim 5, further comprising, if the crusher setting has reached the first pre-defined crusher setting and the material parameter is above the pre-defined value:

recalibrating the crushing equipment such that when the crusher setting has reached the first pre-defined crusher setting, the material parameter has reached the pre-defined value.

8. The method according to claim 5, further comprising, wherein the crusher setting has reached the first pre-defined crusher setting and the material parameter has reached the pre-defined value:

increasing the crusher setting to a second pre-defined crusher setting.

9. The method according to claim 1, wherein the step of decreasing the crusher setting comprises:

monitoring a crusher load in the crushing equipment; and if the crusher load is smaller than a pre-defined crusher load value, decreasing the crusher setting by a pre-defined step.

10. The method according to claim 9, wherein the crusher load is defined from crusher power consumption and/or load indication measures.

11. A crushing equipment for crushing material, the crushing equipment comprising:

a crusher;

a feeding arrangement for feeding material to the crusher;

a secondary equipment arranged downstream from the crusher for sorting out oversized material leaving the crusher;

a recirculation loop for recirculating the oversized material to the crusher; and a control system configured to:

remotely control the feeding arrangement to stop feeding new material to the crushing equipment;

remotely control the recirculation loop to recirculate the oversized material from the secondary equipment to the crusher; and remotely control the crusher to decrease a crusher setting of the crusher, and to keep the crusher setting decreased while the feeding of new material to the crushing equipment, by the feeding arrangement, is stopped, so as to reduce a level of the oversized material in the recirculation loop.

12. The crushing equipment for crushing material in accordance with claim 11, wherein the recirculation loop comprises detection means for determining one or more parameters of material present in the recirculation loop.

13. The crushing equipment for crushing material in accordance with claim 11, further comprising monitoring means for monitoring a crusher power or load in the crushing equipment.

* * * * *